US007385213B2

(12) United States Patent
Chen

(10) Patent No.: US 7,385,213 B2
(45) Date of Patent: Jun. 10, 2008

(54) HIGH DOSAGE RADIOACTIVE DRUG SUBPACKAGING SHIELDING DEVICE

(75) Inventor: Chi-Kuang Chen, Taipei (TW)

(73) Assignee: Becquerel & Sievert Co., Ltd., Taipei (TW)

( * ) Notice: Subject to any disclaimer, the term of this patent is extended or adjusted under 35 U.S.C. 154(b) by 400 days.

(21) Appl. No.: 11/258,051

(22) Filed: Oct. 26, 2005

(65) Prior Publication Data

US 2007/0114474 A1 May 24, 2007

(51) Int. Cl.
*B01J 4/02* (2006.01)

(52) U.S. Cl. ................................ 250/506.1; 250/507.1

(58) Field of Classification Search .............. 250/506.1
See application file for complete search history.

(56) References Cited

U.S. PATENT DOCUMENTS 4,144,461 A * 3/1979 Glasser et al. ........... 250/506.1

* cited by examiner

*Primary Examiner*—Nikita Wells
*Assistant Examiner*—James J Leybourne
(74) *Attorney, Agent, or Firm*—Troxell Law Office, PLLC

(57) ABSTRACT

The present invention provides an improved high dosage radioactive drug subpackaging shielding device, which allows for transversal rotational movements by means of a disk, while outer grooves of support posts hook into inner grooves of long supports, thereby enabling longitudinal rotational adjustments of a drug canister disposed on the long supports. Position of the canister is fixed with a screw down device after making transversal rotational adjustments, and a catch device functioning in coordination with a round-hole perforated disk enables fixing the angle of the canister after making longitudinal rotational adjustments. Furthermore, hook grooves of a carry support are used to hook into inner grooves of support posts, thereby facilitating a user to conveniently detach and transport the canister, and enables the human body to avoid coming in direct contact with the canister containing radioactive drugs, thus preventing radioactive radiation from endangering the human body.

1 Claim, 7 Drawing Sheets

HIGH DOSAGE RADIOACTIVE DRUG SUBPACKAGING SHIELDING DEVICE

BACKGROUND OF THE INVENTION (a) Field of the Invention

The present invention provides a subpackaging shielding device that enables longitudinal and transversal rotation and angular adjustment of a canister. Moreover, a characteristic that enables the canister to be dismounted from a base facilitates transporting it using a carry support.

(b) Description of the Prior Art

Modern radioactive medical drugs are already in extensive use; however, current drug canister devices used by medical teams only allow users to use a syringe to extract the drug within the canister device. Moreover, the canister devices are confined to unidirectional angular adjustment, which causes inconvenience to the user.

SUMMARY OF THE INVENTION

The present invention provides an improved high dosage radioactive drug subpackaging shielding device, which apart from facilitating a user to make rotational adjustments on the device; moreover, the human body is prevented from coming in direct contact with the device when transporting it.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

The present invention provides an improved high dosage radioactive drug subpackaging shielding device, which apart from facilitating a user to make rotational adjustments thereof; moreover, the human body is prevented from coming in direct contact with the device when transporting it.

Figure 1:
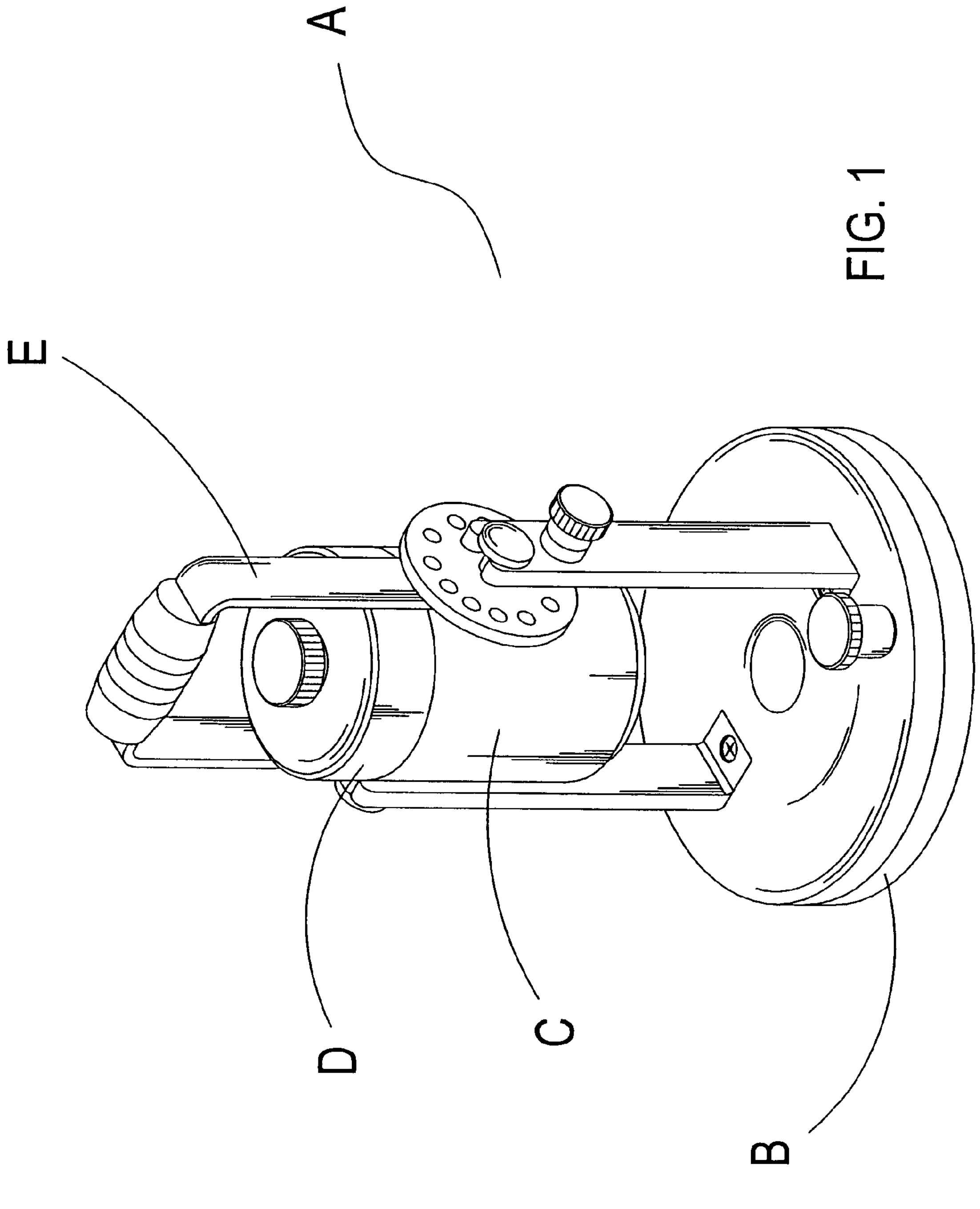
FIG. 1 shows an elevational view according to the present invention.
Figure 2:
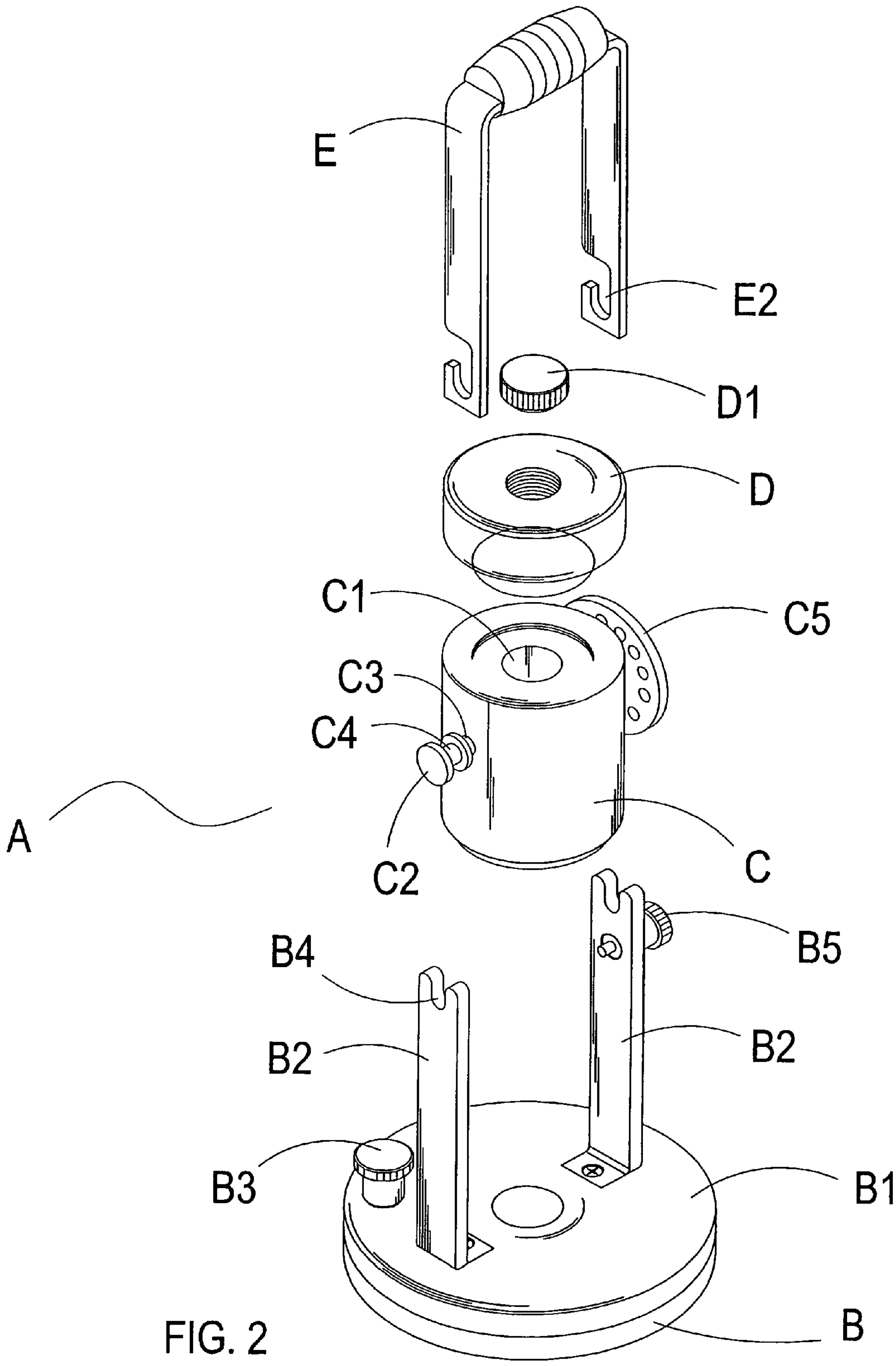
FIG. 2 shows an exploded elevational view according to the present invention.

Referring to FIGS. 1 and 2, which show a subpackaging shielding device A structured to comprise a base B, a canister C, a canister cover D and a carry support E. The present invention further comprises a disk B1 disposed on the base B of the subpackaging shielding device A, which provides for a user to conveniently make transversal rotational adjustments on the canister C. Moreover, support posts C2 are symmetrically configured on an outer surface of the canister C, and an inner groove C3 and an outer groove C4 are defined on each of the support posts C2. The outer grooves C4 provide for respectively disposing within notches of long supports B2, thereby enabling the support posts C2 to be supported on the long supports B2 and furnishing the canister C with functionality to longitudinal rotational movement on the long supports B2.

In order to prevent the human body from coming in contact with the canister C packed with radioactive drugs when transporting the subpackaging shielding device A, a containment cavity C1 is further defined within the canister C of the subpackaging shielding device A of the present invention, which provides for disposing the radioactive drugs therein. The canister cover D is screwed on tight to a top of the canister C, thereby securing the packed drugs within the containment cavity C1. Moreover, a cover D1 is screwed onto the canister cover D, thus enabling the containment cavity C1 within the canister C to form a hermetically-sealed containment space that is able to effectively block the radioactive radiation released by the radioactive drugs. Furthermore, a carry support E is attached to the canister C by means of hook grooves E2 of the carry support E respectively hooking onto the support posts C2, thereby enabling the canister C to be transported using the carry support E.

When transversally rotating and longitudinally rotating the subpackaging shielding device A, a screw down device B3 configured on the base B enables fixing position of the disk B1 after making a transversal rotational adjustment, and a catch device B5 functioning in coordination with a round-hole perforated disk C5 enables fixing the angle of the canister C after making a longitudinal rotational adjustment.

Figure 3:
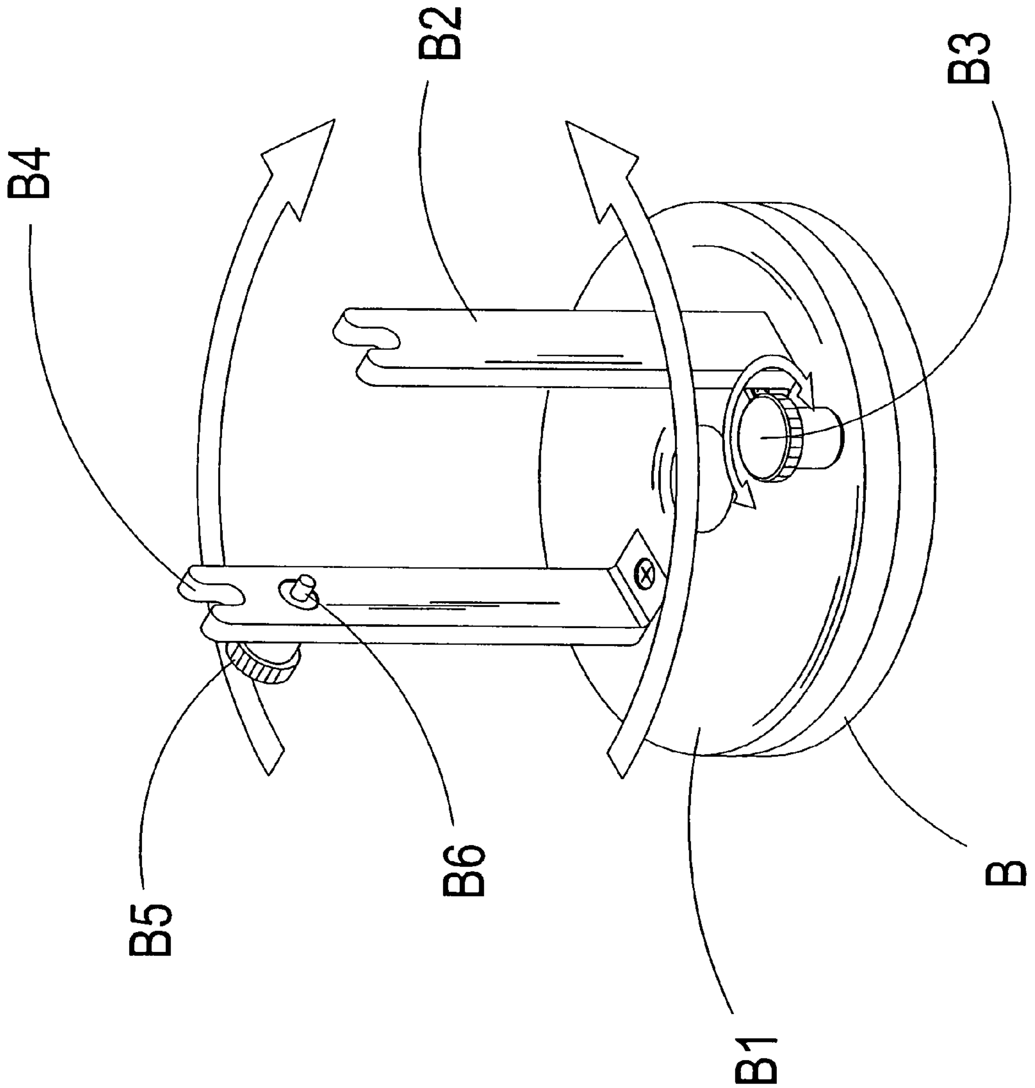
FIG. 3 shows a schematic view of a base of the present invention in use.

Referring to FIG. 3, which shows an embodiment of the improved high dosage radioactive drug subpackaging shielding device of the present invention in use, wherein the pair of long supports B2 are symmetrical affixed to the disk B1 disposed on the base B, thereby enabling transversal rotational adjustment of the disk B1 on the base B. Moreover, the screw down device B3 disposed to one side of the base B provides a secure fixing between the disk B1 and the base B by screwing and pressing down thereon. Furthermore, the notches B4 are respectively defined in upper ends of the pair of symmetrically disposed long supports B2, and one end of the catch device B5 is disposed at a side of one of the notches B4 of the long supports B2 so as to penetrate the long support B2, thereby forming a protruding member B6 that protrudes out from an inner side of the long support B2.

Figure 4:
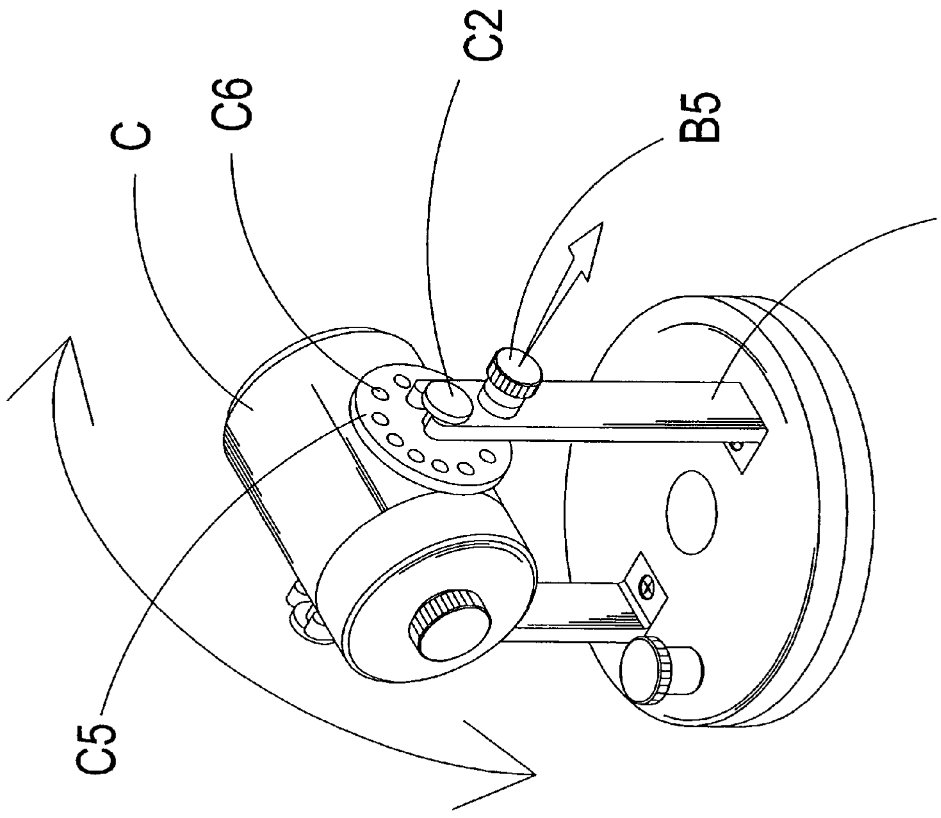
FIG. 4 shows a schematic view of a canister of the present invention in use.
Figure 5:
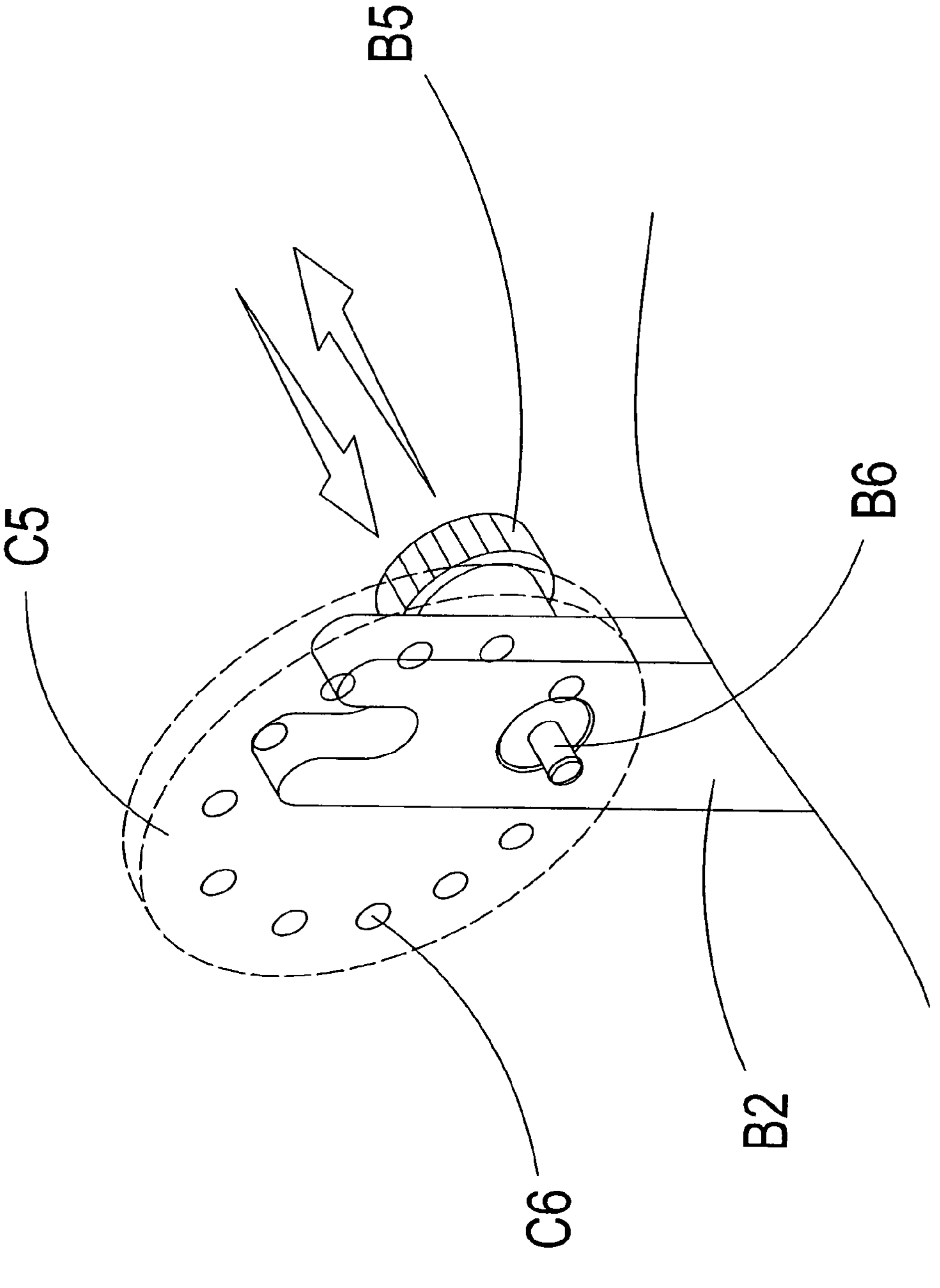
FIG. 5 shows a schematic view of a round hole perforated disk of the present invention in use.

Referring to FIGS. 4 and 5, wherein FIG. 4 shows the canister C disposed on the long supports B2, when the catch device B5 disposed on the long support B2 is pulled out, through functional coordination of the round hole perforated disk C5 configured on one of the support posts C2 and the catch device B5, the protruding member B6 withdraws into the long support B2, thereby enabling transversal rotational adjustment of the canister C on the long supports B2. Moreover, when the catch device B5 is pushed in, the protruding member B6 protrudes out one side of the long support B2 and penetrates one of a plurality of holes C6 defined in the round hole perforated disk C5, thereby fixing final rotational position of the canister C.

Figure 6:
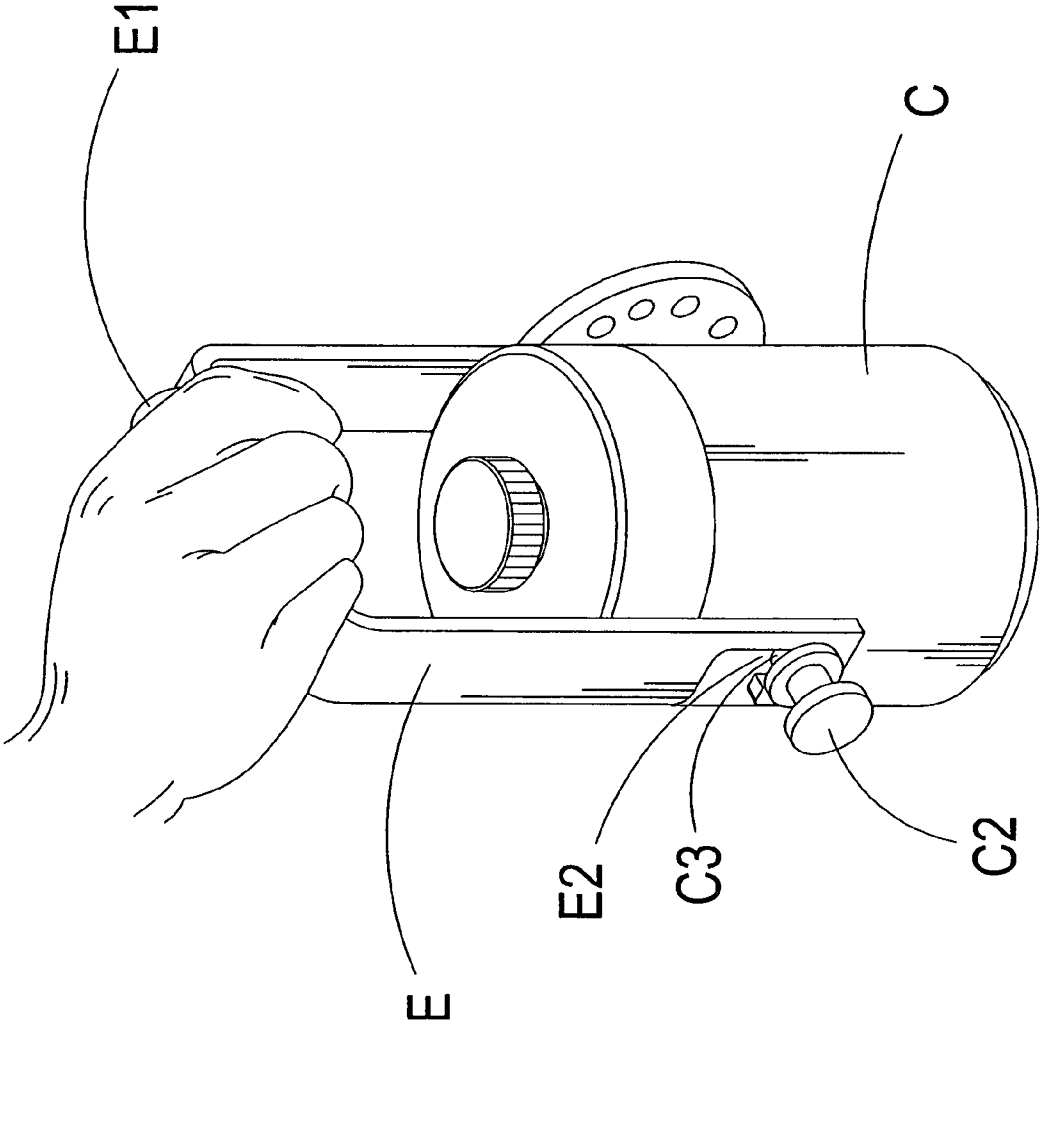
FIG. 6 shows a schematic view of a carry support of the present invention in use.

Referring to FIG. 6, which shows the carry support E symmetrically parallel connected to a carry portion E1. Moreover, the hook grooves E2 respectively defined on ends of the carry support E are hooked within the respective inner grooves C3 on the support posts C2, thereby facilitating a user to carry and transport the canister C.

Figure 7:
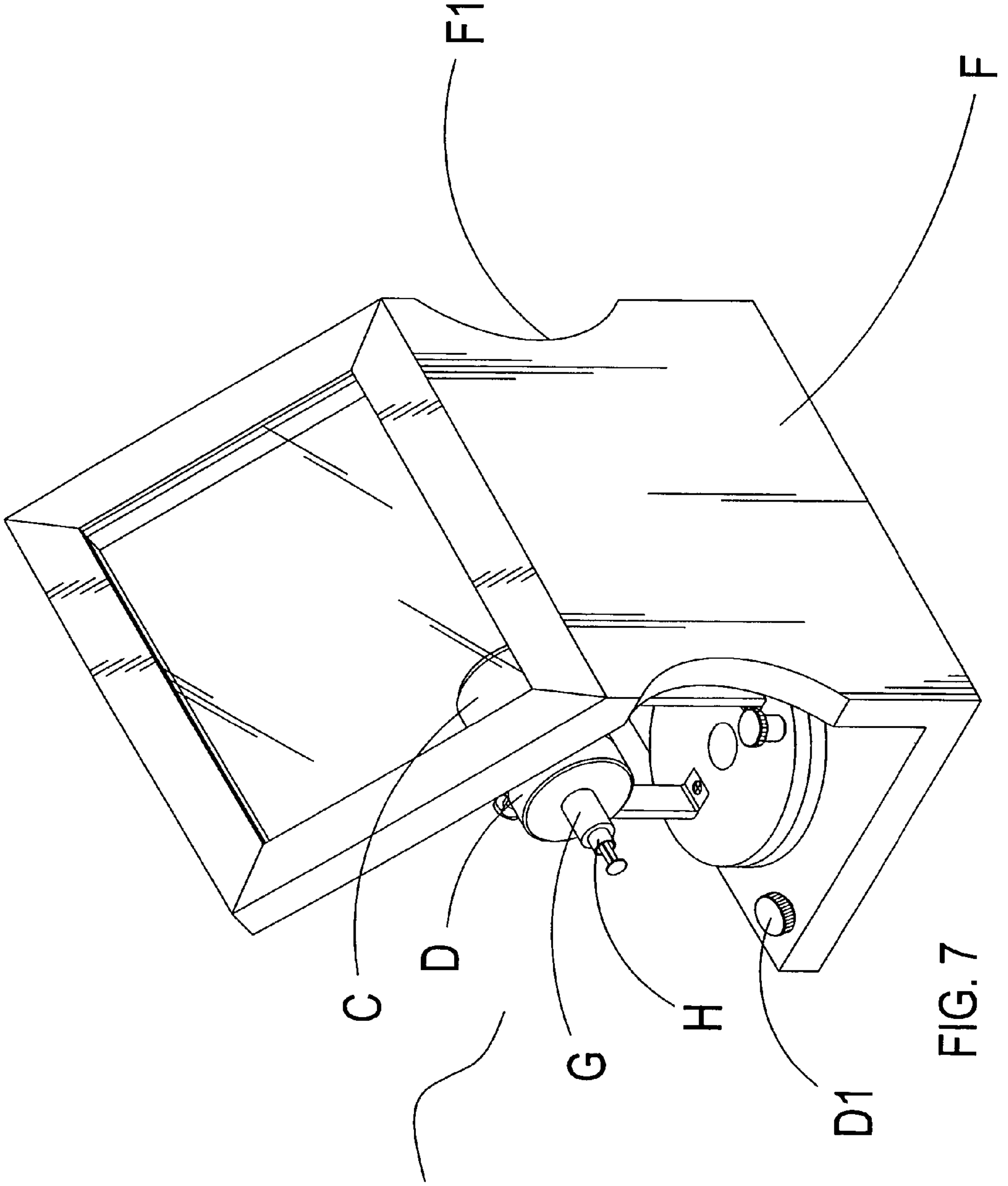
FIG. 7 shows an embodiment of the present invention.

Referring to FIG. 7, when using the subpackaging shielding device A of the present invention disposed on an operating platform F, a tungsten sleeve G is inserted into an unscrew portion of the cover D1 of the canister cover D. Moreover, the tungsten sleeve covers a syringe H enclosed therein, and arched recesses F1 respectively defined in side edges of the operating platform F enable the hands of a user to enter therein and extract the radioactive drugs packed within the canister C using the syringe H.

In order to better explicitly disclose advancement and practicability of the present invention, advantages of the present invention are listed below:

1. Capable of multiangle rotational movement, thereby facilitating the user in adjusting the canister C to an ideal position.

2. The carry support E is used for transporting the device, thereby preventing radioactive rays released by the radioactive drugs from causing harm to the human body.

3. Commercially competitive.

4. Has commercial use value.

5. Has originality.

According to the aforementioned, the present invention assuredly complies with essential elements as required for a new patent application, in accordance with which a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A high dosage radioactive drug subpackaging shielding device, comprising a base, a canister, a canister cover and a carry support;

and is characterized in that when the canister is disposed on long supports, the canister can be transversally rotated by means of a disk of the base, moreover, a screw down device configured on the base facilitates a user to adjust position of the canister to that required;

outer grooves of support posts hook into inner grooves of long supports, thereby enabling longitudinal rotation of the canister on the long supports, and a protruding member of a catch device functioning in coordination with holes in a round-hole perforated disk facilitates a user to adjust the canister to a required angle and position;

furthermore, hook grooves of the carry support are used to hook into inner grooves of the support posts, thereby facilitating a user to transport the canister, and enables the human body to avoid coming in direct contact with the canister containing radioactive drugs, thus preventing radioactive radiation from endangering the human body.

* * * * *